United States Patent Office 3,243,477
Patented Mar. 29, 1966

3,243,477
PROCESS OF GRAFTING A 7–8 MEMBERED LAC-
TAM RING ONTO POLYACRYLYL HALIDE
William B. Black, Raleigh, N.C., and David B. Capps,
Ann Arbor, Mich., assignors to Monsanto Company, a
corporation of Delaware
No Drawing. Filed Dec. 10, 1962, Ser. No. 243,640
2 Claims. (Cl. 260—857)

This application is a continuation-in-part of our co-pending application, Serial No. 119,264, filed June 26, 1961, now abandoned.

This invention concerns novel graft copolymers as new compositions of matter. It further relates to a method for preparing the novel graft copolymers.

As is known, the term "graft copolymers" refers to polymeric products consisting essentially of polymeric chains derived from one polymerizable material (main chains) to which are chemically attached a number of polymeric chains derived from another polymerizable material (branch chains), the branch chains having one end free. This is in contrast to the more common and familiar copolymer wherein the monomeric units alternate in a regular or random manner depending upon the monomers used and the polymerization process employed. As is readily apparent, the properties of such copolymers are essentially an average of the properties of the corresponding homopolymers.

Now, referring again to graft copolymers, products with unusual and distinctive properties may sometimes be obtained when different polymerizable material is employed to prepare the side chains from that used in preparing the main chains. For in such instances, the different chemical structures of the main and side chains permits an interesting blend of properties in the ultimate polymer formed.

It is, therefore, a principal object of this invention to provide a novel graft copolymer in which the main chain or backbone is different from that of the side chains.

It is a further object of this invention to provide a method for preparing novel graft copolymers wherein the main chain or backbone is a homopolymer having activating sites for the polymerization of lactams which can be grafted thereon.

Other objects will become apparent as the following description of our invention proceeds.

The novel graft copolymers of this invention are characterized by the following general structural formula:

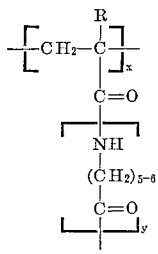

wherein R represents either hydrogen, an aryl radical or an alkyl radical with from 1 to 7 carbon atoms; wherein $x$ represents a number indicative of the extent of polymerization of the backbone polymer and can be from 5 to 10,000; and wherein $y$ represents the extent of polymerization of the branch chains and may be a number of from 5 to 5,000.

We produce the graft copolymers of the above general structure by first preparing a backbone homopolymer which has activating sites for initiating lactam polymerization. These activating sites are subsequently employed to induce or initiate the polymerization of lactam monomers which are brought into contact therewith. Then as the lactam chains form they become grafted on to the pre-formed backbone polymer. Pre-formed homopolymers which are eminently suited for accomplishing this result have the following general formula:

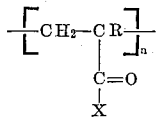

wherein $n$ is an integer of from 5 to 10,000 and X is a halide, preferably chlorine.

These polymers are known and may be obtained by the polymerization of monomers, such as acrylyl chloride, methacrylyl chloride, butacrylyl chloride and alpha-phenylacrylyl chloride. Standard polymerization procedures may be employed. For example, the monomer is placed in a suitable solvent, such as carbon tetrachloride, and the resulting solution is brought to mild reflux where it is maintained until the polymer desired is formed. Advantageously, peroxide catalysts, such as benzoyl peroxide, are generally employed.

Upon this pre-formed polymer with activating sites for initiating lactam polymerization, we then graft polymerize a 7 to 8 membered ring lactam of the following general formula:

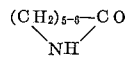

Compounds contemplated and embraced by this formula are epsilon-caprolactam and oenanthic lactam.

In the reaction mixture of pre-formed polymer and lactam monomer used in the preparation of our novel graft copolymers, the pre-formed polymer may be present in an amount of from about 0.1 to 15 percent by weight and the lactam monomer in an amount of from about 85 to 99.9 percent by weight, based on the total weight of the mixture. It is a primary requisite that part of the lactam monomer in the reaction mixture be present in the form of an alkali metal salt, e.g., as the sodium or potassium salt. This salt may be pre-formed or formed in situ, for example, by introducing a sodium or potassium hydride into the reaction mixture with the homopolymer and lactam monomer. It is necessary that the lactam salt be present in an amount which at least slightly exceeds the quantity required to neutralize all of the acyl halide groups of the pre-formed backbone polymer. That is, it is necessary that some lactam salt be present after neutralization of the acyl halide has been attained in order to effect chain growth of the lactam side chains. It is, of course, understood that free lactam must also be present wtih the salt thereof—there being no restriction on the relative amounts of these two materials save that enough salt is present to meet the requirement recited above.

The grafting reaction may be carried out either in bulk, by emulsion or dispersion techniques or in solution. When conducting the reaction in solution, any inert reaction medium may be employed, dioxane, for example, being highly satisfactory. Anhydrous conditions are employed and nitrogen blanketing may be used to advantage in order to better assure anhydrous conditions. The reaction temperature must not, of course, be lower than the melting point of the epsilon-caprolactam or oenanthic lactam, whichever is employed as a reactant. In general, the reaction temperature should be within the range of from about 75° C. to about 270° C. with from about 100° C. to 150° C. being preferred.

In order to illustrate the invention in greater detail, the following specific preparation is presented. It is to be understood that the example is given by way of illustration only and is not intended to be limitative.

*Example*

Into a 3-necked flask fitted with a thermometer and a water-cooled condenser, protected from atmospheric moisture by an anhydrous calcium sulfate filled drying tube, there was introduced 15.0 grams of acrylyl chloride and 150 ml. of benzene which had been dried over calcium hydride. Then to this solution there was added 0.1 gram of dried benzoyl peroxide. This mixture was then brought to and kept under a mild reflux for approximately 48 hours. After this period of reaction a solid, pale yellow polyacrylyl chloride had settled out in the flask and was separated from the mother liquor by decantation. The recovered polymer was then crushed under benzene to a powder and the powder was washed repeatedly with dry benzene to extract minute traces of monomer. The polymer was then dried with a stream of dry nitrogen.

The above prepared polyacrylyl chloride in an amount of 0.18 gram (0.002 mol) was added to 11.3 grams (0.1 mol) of a purified epsilon-caprolactam monomer. The temperature of the mixture was brought to about 100° C. and after 10 minutes the polyacrylyl chloride and the caprolactam monomer formed a homogeneous solution. To this solution there was then added 0.15 gram of sodium hydride. Within 2 minutes at a temperature of 100° C. the reaction mixture set-up to a plastic mass. Fibers were conveniently pulled from this plastic polymer mass.

The novel graft copolymers produced in accordance with this invention have valuable properties, for example, they are suitable for use in the production of films and fibers, as has been demonstrated in the foregoing examples. They may also be adapted for other end-uses to which polymers are often applied, such as coatings, lacquers and plastics.

Various modifications of the invention as described hereinabove will be apparent to those skilled in polymer chemistry. Hence, it will be understood that the invention is not limited to the foregoing description but only by the appended claims.

We claim:

1. A process for preparing a graft copolymer which comprises reacting under anhydrous conditions and at a temperature of from about 75° C. to 270° C. a mixture of from 0.1 to 15 percent by weight of a pre-formed polymer of the formula:

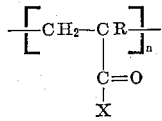

wherein R is selected from the group consisting of hydrogen, an alkyl radical and an aryl radical; wherein $n$ is an integer of from 5 to 10,000 and X is a halide; and from 85 to 99.9 percent by weight of the combination of (A) a 7 to 8 membered ring lactam and (B) an alkali metal salt of said 7 to 8 membered ring lactam, said alkali metal salt being present in an amount which exceeds that necessary to completely neutralize all of the acyl halide groups of said pre-formed polymer.

2. A process for preparing a graft copolymer which comprises reacting under anhydrous conditions and at a temperature of from about 75° C. to 270° C. a mixture of from 0.1 to 15 percent by weight of a pre-formed polymer of the formula:

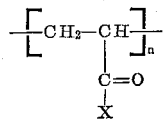

wherein $n$ is an integer of from 5 to 10,000 and X is a halide; and from 85 to 99.9 percent by weight of the combination of (A) epsilon-caprolactam and (B) an alkali metal salt of said epsilon-caprolactam, said alkali metal salt being present in an amount which exceeds that necessary to completely neutralize all of the acyl halide groups of said pre-formed polymer.

References Cited by the Examiner

UNITED STATES PATENTS 3,136,738   6/1964   Hedrick et al. _____ 260—857

MURRAY TILLMAN, *Primary Examiner.*

P. LIEBERMAN, *Assistant Examiner.*